UNITED STATES PATENT OFFICE.

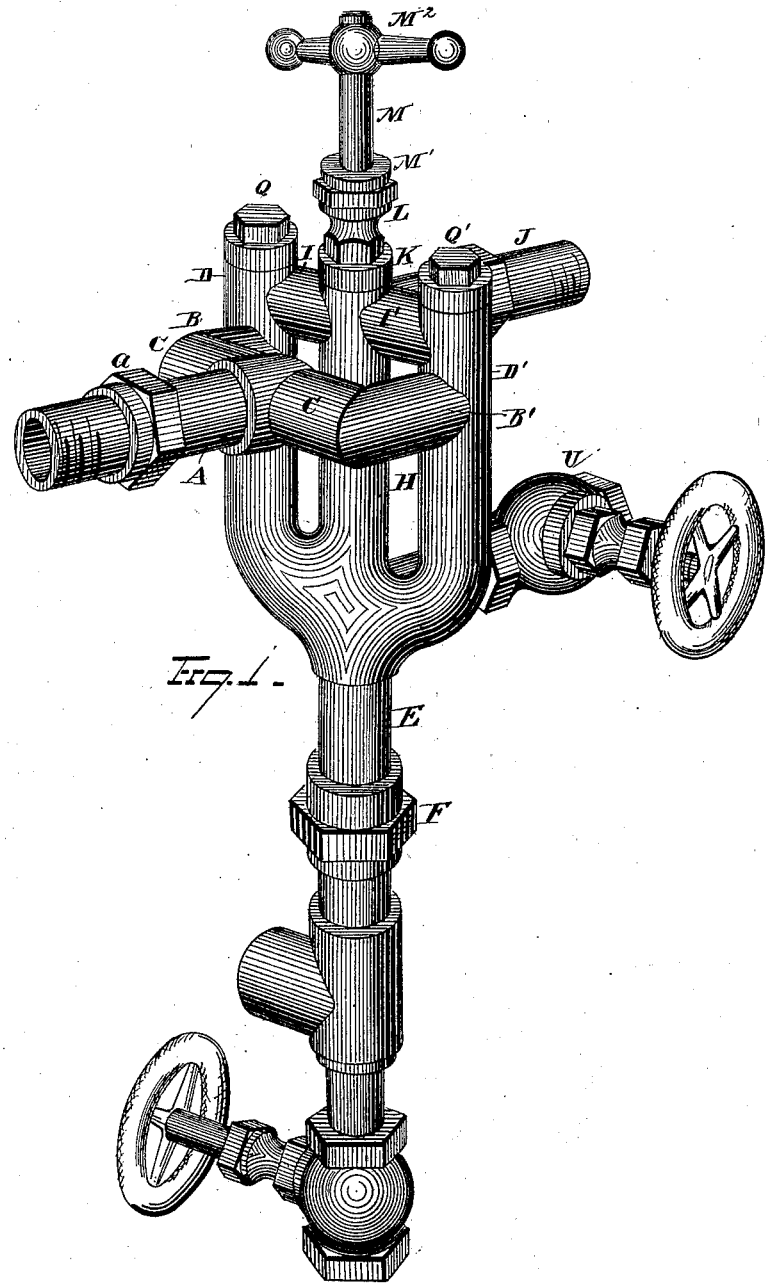

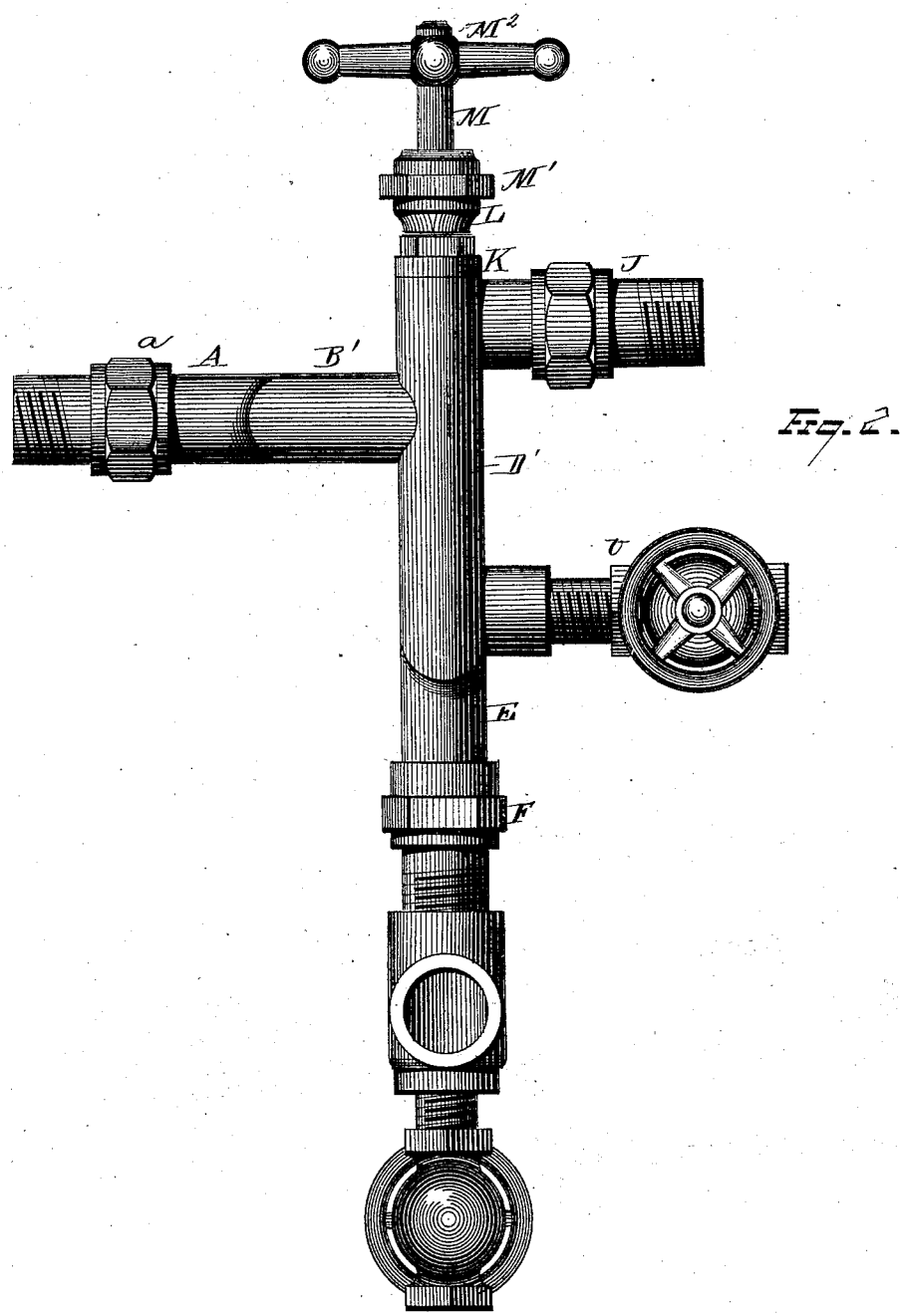

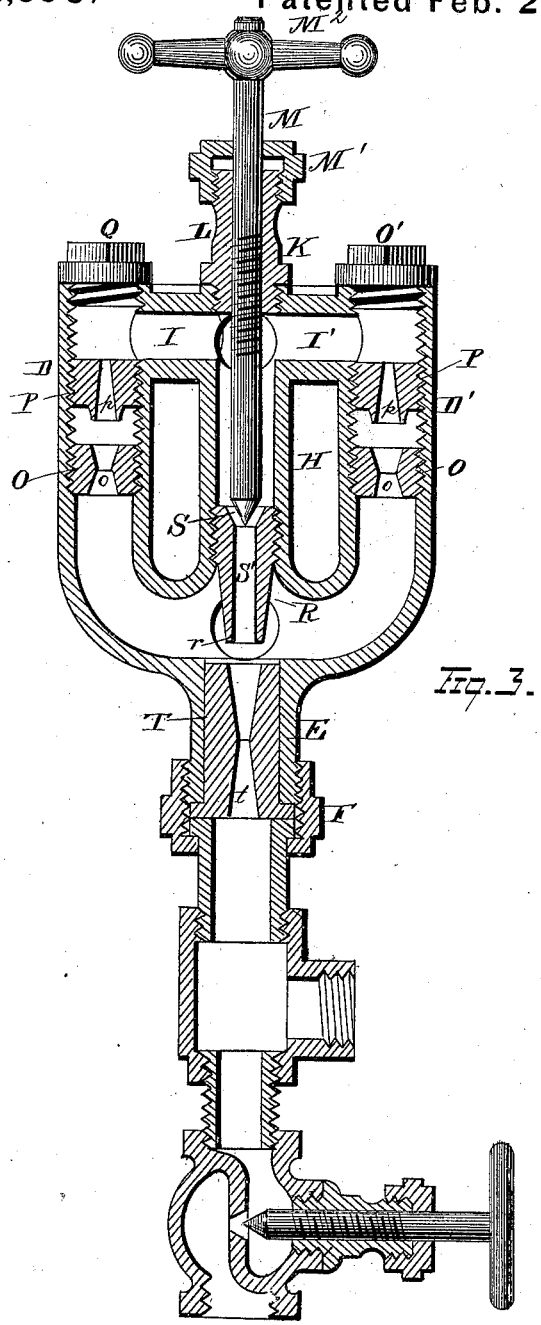

JOHN CAIN, OF SANDY LAKE, PENNSYLVANIA, ASSIGNOR OF ONE-THIRD HIS RIGHT TO ISABEL EBERMAN.

IMPROVEMENT IN INJECTORS.

Specification forming part of Letters Patent No. 212,590, dated February 25, 1879; application filed October 22, 1878.

*To all whom it may concern:*

Be it known that I, JOHN CAIN, of Sandy Lake, in the county of Mercer and State of Pennsylvania, have invented certain new and useful Improvements in Injectors; and I do hereby declare the following to be a full, clear, and exact description of the invention, such as will enable others skilled in the art to which it pertains to make and use it, reference being had to the accompanying drawings, which form part of this specification.

My invention relates to an improvement in injectors for raising and feeding, the object being to provide two independent steam-jets in separate conduits for raising the water and a single steam-jet for aiding the lifting steam-jets to force the water into steam-boilers, or to raise the water to any desired point; and to this end my invention consists, first, in the combination, with two injectors, located in separate conduits or receiving-tubes, which connect with the water-supply, of a third injector for forcing the water into a steam-boiler, or to any other desired point, the three injectors arranged to force the water in parallel jets.

My invention further consists in the several details of construction and combination of parts, as will hereinafter be explained, and pointed out in the claims.

In the accompanying drawings, Figure 1 is a view, in perspective, of my improved injector. Fig. 2 is a side elevation, and Fig. 3 a vertical section, of the same.

A represents the supply-pipe, which is furnished with a coupling, $a$, for the attachment of a pipe leading to a well, tank, or other water-supply. B B' are branch supply-pipes, connected to the main supply-pipe by the cross-pipe C. Branch supply-pipes connect with the receiving-pipes D D' about midway their length, as illustrated in the accompanying drawings.

The receiving-pipes D D' merge into or connect with a single discharge-pipe, E.

When the apparatus is to be used for feeding water to steam-boilers, a pipe leading to the boiler is attached to the pipe-coupling F, connected with the main discharge-pipe E at any suitable point below the coupling F. Between the receiving-pipes D D' is formed a steam-conduit, of the form of a Greek cross, the lower and longer arm, H, of which is the forcing-pipe, and connects with the side pipes, D D', and is in vertical line with the main discharge-pipe E.

The short projecting arms I I' of the central steam-conduit connect with the upper ends of the side pipes, D D'.

J is the main steam-supply pipe, and connects with any suitable steam-generator. Within the short upper arm, K, of the steam-conduit is secured a plug, L, which is provided with an internal screw-threaded opening, within which fits the valve-stem M, which has corresponding screw-threads formed thereon. The outer end of the plug L is of concave form to receive suitable packing material, and is surrounded by an adjustable cap, $M^1$. The outer end of the valve-stem is provided with a handle, $M^2$, for operating the valve.

The receiving-pipes D D' are provided with internal screw-threads, which extend from their upper ends to a point below the water-supply branch pipes B B'.

Within each of the receiving-tubes is placed a plug, O, which is provided with a central passage, $o$, which flares outwardly in opposite directions from its center.

The plug O is screw-threaded, and is turned down within the receiving-tube, so that its upper end will be slightly above the lower part of the branch-pipe connection.

Above the plug O is placed a plug, P, having a central opening, $p$, which gradually increases in diameter from the upper to the lower side of the same. Plug P is located immediately above the branch pipe of the water-supply.

The upper ends of the receiving-tubes D D' are closed by screw-threaded plugs Q Q'. Within the lower end of the forcing-pipe H is secured a perforated plug or nozzle, R, the discharge end $r$ of which extends nearly to the main discharge-opening of the injector.

The lower end of the valve-stem is formed conical, thereby constituting a conical or needle valve, S, and enters the passage S' in the nozzle R.

Within the discharge-pipe E is placed a plug, T, having a central passage, $t$, which flares outwardly from the center thereof.

U is an exhaust-cock, located at the point of junction of the receiving-pipes, the forcing-pipe, and the discharge-pipe.

Having described the essential features of construction of my improved injector, I will now describe the operation.

As the live steam enters the supply-pipe J it flows into the receiving-pipes D D', the central forcing-pipes H being closed by the valve S. The steam as it flows into the receiving-pipes is checked by the perforated plug P, located immediately above the point of connection between the water-supply pipes and the receiving-pipes, and issues from the lower end of the plug with great force in the form of a conical jet, which latter is located directly opposite the mouth of the water-supply pipe.

The steam-jets are directed into the flaring passage in the perforated plug O, located directly below the mouth of the water-supply branch pipe.

The strong steam issuing directly across and at right angles to the openings of the water-supply pipes operates to create a partial vacuum in the water-pipes and allow the atmospheric pressure to force the water from the well or tank upwardly through the water-supply pipes into the receiving-pipes D D'.

As the water enters the receiving-pipes upon the lower perforated plug the impact of steam forces the contained water through the central opening in the plug, and drives the water to the discharge-pipe E.

The conical or needle valve being opened, steam flows downwardly through the forcing-pipes, and is ejected through the plug or nozzle R, placed in the lower end of said pipe, and serves to force the water collected at the junction of the receiving-pipes through the outwardly-flaring passage in the plug T, located in the discharge-pipe E.

The water is forced through the discharge-pipe, and from thence into a steam-boiler, or the water may be forced to any desired point, as the apparatus is intended and adapted for any employment in raising and forcing water to any desired point.

To start the apparatus the valve governing the flow of steam in the forcing-pipe is closed, and the exhaust and overflow valves are opened. The throttle-valve governing the flow of steam to the injector is then opened, and steam allowed to flow through the receiving-pipes and raise water therein until a full stream of water issues from the exhaust-valve, when the latter is closed. The valve in the forcing tube or pipe is then opened and the overflow-pipe closed.

An injector constructed in accordance with my invention possesses many important and valuable features. Where one or more injectors are employed in the same pipe the apparatus is sometimes rendered inoperative, owing to the accumulation of foreign substances in the passages, which check and stop the flow of steam and water.

In my improved apparatus two independent injectors are employed in raising the water and forcing it to the ejector or third injector. Hence, if one of the injectors should become inoperative for any cause the other would continue to work, and thus insure the proper supply of water to a boiler or other receptacle, and, by reason of the fact that the injector may be kept at work continuously, it will almost invariably operate to rid either injector from any foreign substances that may have collected therein.

Again, the labor of raising water is so disposed among the three injectors that they will each effect the maximum amount of work. The two injectors in the receiving-tubes serve to raise the water to the receiving-tubes, and also prevent any back-flow of the water after it has been raised and carried to the receiving-tubes. The third injector then acts on the water thus raised, and serves to not only assist the two injectors in retaining a partial vacuum in the receiving-pipes, and thus lessen the work of the primary injectors, but also operates to eject the water from the apparatus.

The several pipes constituting my improved apparatus are so formed that the water contained therein will drip into the discharge-tube, and thus prevent any damage sometimes occasioned by water freezing to the injector.

Having fully described my invention, what I claim as new, and desire to secure by Letters Patent, is—

1. A compound injector consisting of two separate and distinct injectors, located in independent tubes or pipes, each having a direct communication with the water-supply, in combination with a single injector located at the juncture of the pipes of the primary injectors and discharge-pipes, the three injectors arranged to force the water in parallel jets, substantially as set forth.

2. In a compound injector, the combination, with the receiving-tubes D D' and perforated plugs located therein at the juncture of the water-supply pipes which connect with said tubes, of a parallel central forcing-tube provided with a perforated plug which projects into the passage formed at the juncture of tubes D D' and discharge-tube E, and a conical or needle valve for regulating the flow of steam through the forcing-tube, substantially as set forth.

3. In a compound injector, the combination, with the pipes D D' H and discharge-pipe E, of an exhaust-valve located at the juncture of all of said four pipes, substantially as set forth.

In testimony that I claim the foregoing I have hereunto set my hand this 12th day of October, 1878.

JOHN CAIN.

Witnesses:
J. A. McCORMICK,
E. G. EBERMAN.